(12) United States Patent
Schrödl

(10) Patent No.: US 6,373,160 B1
(45) Date of Patent: Apr. 16, 2002

(54) ELECTRIC MACHINE

(76) Inventor: Manfred Schrödl, Untere Haupstrasse 9, A-7223 Sieggraben (AT)

( * ) Notice: Subject to any disclaimer, the term of this patent is extended or adjusted under 35 U.S.C. 154(b) by 0 days.

(21) Appl. No.: 09/582,635

(22) PCT Filed: Jan. 29, 1999

(86) PCT No.: PCT/AT99/00024

§ 371 Date: Jul. 28, 2000

§ 102(e) Date: Jul. 28, 2000

(87) PCT Pub. No.: WO99/39426

PCT Pub. Date: Aug. 5, 1999

(30) Foreign Application Priority Data

Jan. 30, 1998 (AT) .............................................. 188/98

(51) Int. Cl.[7] .............................................. H02K 21/10
(52) U.S. Cl. ..................................... 310/114; 310/126
(58) Field of Search ................................. 310/114, 112, 310/113, 266, 68 R, 126; 318/809, 811, 812

(56) References Cited

U.S. PATENT DOCUMENTS

| | | | |
|---|---|---|---|
| 3,308,318 A | * 3/1967 | Dunaiski et al. ............ | 310/114 |
| 3,789,281 A | 1/1974 | Shibata ....................... | 318/696 |
| 4,260,944 A | 4/1981 | O'Mahony ................... | 322/48 |
| 4,387,335 A | 6/1983 | Fisher et al. ................. | 322/32 |
| 5,172,784 A | 12/1992 | Varela Jr. .................... | 180/55.6 |
| 5,334,898 A | 8/1994 | Skybyk ........................ | 310/268 |
| 5,528,094 A | * 6/1996 | Hasebe et al. ............... | 310/112 |
| 5,675,203 A | 10/1997 | Schulze et al. .............. | 310/113 |
| 5,801,497 A | 9/1998 | Shamoto et al. ............. | 318/139 |

FOREIGN PATENT DOCUMENTS

| | | |
|---|---|---|
| CA | 2244965 | 12/1996 |
| DE | 711928 | 9/1941 |
| DE | 840411 | 4/1952 |
| DE | 890088 | 8/1953 |
| DE | 3142740 | 6/1982 |
| DE | 3313768 | 10/1984 |
| EP | 0577980 | 1/1994 |
| EP | 0798844 | 10/1997 |
| EP | 0817359 | 1/1998 |
| FR | 2390847 | 8/1978 |
| GB | 2022325 | 12/1979 |
| GB | 2278242 | 11/1994 |
| JP | 5-276719 | 10/1993 |
| JP | 5276719 | 10/1993 |
| WO | 92/01532 | 2/1992 |
| WO | 92/18346 | 10/1992 |
| WO | 94/19208 | 9/1994 |
| WO | 97/23940 | 7/1997 |

OTHER PUBLICATIONS

Patent Abstracts of Japan, E Field, vol. 18, No. 60, Jan. 31, 1996.
Patent Abstracts of Japan, vol. 009, No. 181 (E–331), & JP 60 051426 (Mar. 22, 1985).
Patent Abstracts of Japan, vol. 008, No. 231 (E–274), & JP 59 113750 (Jun. 30, 1984).
Patent Abstracts of Japan, vol. 009, No. 240 (E–345) & JP 60 091847 (May 23, 1985).

* cited by examiner

Primary Examiner—Elvin Enad
Assistant Examiner—Dang Dinh Le
(74) Attorney, Agent, or Firm—Greenblum & Bernstein, P.L.C.

(57) ABSTRACT

Electric rotary current machine that includes a casing and a stator fitted within the casing. The stator has at least one stator winding. At least two mechanically separate rotors are rotatably mountable within the casing and have a same axis of rotation. In this way, each rotor has electromagnetic interaction with the stator when the stator is electromagnetically active. The rotor speeds are the same or different. A motor control is arranged to control a supply to at least one of said at least one stator winding by superposition of at least two rotary field components, one for each rotor.

16 Claims, 5 Drawing Sheets

ELECTRIC MACHINE

BACKGROUND OF THE INVENTION

1. Field of the Invention

The invention relates to an electric machine of the rotary current type, whereby in a casing a stator is fitted with at least one stator winding and at least two mechanically separate rotors, whereby the rotors have the same axis of rotation, and whereby each rotor has electromagnetic interaction with the electromagnetically active stator, whereby the rotor speeds may be the same or different.

2. Discussion of Background Information

It is known that rotary current machines can be used advantageously for electromechanical energy transformation. These are fitted with a stator and rotary current winding system through which electric current flows, and have interaction with a magnetic field that is created either by permanent magnets, by field windings in the case of synchronous machines, or by the stator winding itself in asynchronous and reluctance machines, or by a combination of these possibilities.

The manufacture of the known electromechanical drives or purely mechanical drives, for example gears in which two different, usually independent speeds are required, is very complicated.

From EP-A-798844, an electric machine of the rotary current type is known, which in a casing has a stator with at least one stator winding and at least two, mechanically separate rotors. The rotors have the same axis of rotation, and each rotor has electromagnetic interaction with the electromagnetically active stator, whereby the rotor speeds may be the same or different.

Furthermore, from WO-A-9218346, DE-A-3313768 and GB-A-2278242, electric machines are known whereby in a casing a stator is fitted with at least one stator winding and at least two mechanically separate rotors.

From D3 WO-A-9201532, a work spindle drive for a tool machine is known, which has several adjustable speeds. In this drive, two electric motors are arranged one after the other on the same axis, whereby each electric motor is fitted with a choke with phase control for adjusting the infinitely variable speed. Each choke acts only on one electric motor.

Last but not least, from EP-A-817359 an electric motor is known, which has a stator and two rotors on one axis, and which can be used as a vehicle drive.

SUMMARY OF THE INVENTION

All the electric machines mentioned above have the disadvantage, however, that for the generation and use of two different speeds or torques they require two stator windings and two current rectifiers, which means that they require more space and more expensive hardware.

The aim of the invention is to create an electric machine that avoids the above disadvantages and with which two, usually independent speeds can be realised, such as required for example in the drives of motor vehicles or in piston engines.

The invention is characterised by the fact that the supply of at least one of the windings is provided by superposition of at least two rotary field components, one for each rotor, controlled by the motor control.

With this invention, it is for the first time possible to produce an electric drive system that can be manufactured and used economically. This offers the surprising advantage that the control of two electrically powered rotors running at different speeds is possible with relatively simple hardware and, preferably, with one stator winding and only one supplying electronic power system. Of particular advantage thereby is that fact that compared with the known solutions only about half as many electric components and windings are required.

A further advantage of this invention is the fact that, unlike the known electromagnetic drives or purely mechanical drives, such as gears in which two different, usually independent speeds are required, major parts such as the stator plate package, the casing elements, parts of the Controls, Can be spared. The drive system according to the invention can be used for example in pump/fan combinations, e.g. in oil burner drives or cooling systems, motor/motor fan combinations, or as a drive with differential shafts with two mechanical outputs. Moreover, mechanical gears with variable transmission can be realised electrically, from and to which electric power can also be fed by means of a mechanical-electric-mechanical converter. For example, in this way a drive for a motor vehicle with gear function, clutch function, starter function and integrated power generation can be realised. Furthermore, vibration torques on one gear side, such as those generated in piston engines, can be compensated by periodical electric power in- and output via the electric intermediate stage.

In accordance with a particular feature of the invention, the stator has two separate windings, whereby each winding is supplied by a source of electric power, preferably with independent control, and each winding has electromagnetic interaction with at least one rotor. The advantage of this array with two independent windings lies in the fact that both parts of the engine can be controlled entirely independent of each other, and that they have only very little influence on each other.

In accordance with a special feature of the invention, at least one of the windings of the stator is designed as a groove or air-gap winding. The advantage thereby is that these windings can be manufactured rationally.

In accordance with a further feature of the invention, at least one rotor is designed as an inner rotor and/or at least one rotor is designed as an outer rotor. With this design, a compact engine model is possible.

In accordance with a further feature of the invention, the rotors and the stator are arranged in accordance with the principle of a disc-type rotor. Thereby, the two windings as groove or air-gap windings are located on the left and right of the disc-type stator. Accordingly, the rotors are also designed as disk-type rotor with permanent magnet excitation, cage rotor, reluctance structure, etc., on the left and right of the stator. The two stator winding systems are in turn supplied by two generally separate power sources.

In accordance with a special design of the invention, the stator has one winding, whereby this winding generates a magnetic field with at least two marked rotary frequency components that have selective electromagnetic interaction with the rotors. The advantage of this design lies in the fact that one winding and its corresponding supply, preferably an inverter, can be spared, and the two frequency components are already superimposed on the signal side by two motor part controls, and supplied by a common power part via the drive. The price for this advantage is a higher loss and vibration torque, but this is often acceptable in return for the more economic drive.

In accordance with a further feature of the invention, the electric power is fed to or from the windings of the stator via electronic power modules, such as transistor, GTO inverter, diode rectifier and the like. The advantage thereby is that with the current state of the art this technology guarantees perfect function.

In accordance with a further design of the invention, at least two rotors are linked via at least two windings and an electronic power module as an electric gear. The design of the double or multiple rotor machine as a gear offers the possibility of smooth speed transmission with simple controllability via an electric intermediate stage. Moreover, it provides a coupling function if required, whereby the system is uncoupled if a power part is not enabled.

In accordance with a further design of the invention, electric power can be exchanged with an electric system via the electric gear intermediate stage. Thereby it is of advantage that electric power can be drawn from the electric intermediate circuit in addition, in order to realise an electric power supply. Moreover, with the electric power supply a temporarily or permanently increased mechanical performance can be provided at the gear output.

In accordance with a further feature of the invention, the rotors are designed as differential gear. Advantageously, a differential gear function can be realised by preferably electric power supply and bilateral mechanical drawing of power.

In accordance with a further design of the invention, a common electronic power input module and a number of electronic power output modules corresponding to the number of windings are provided, which are controlled by the motor control. Thus, torque fluctuations at one of the mechanical inputs of the gear can be compensated by electric power supply and discharge or be generated arbitrarily, for example in a vibration or breakaway function.

In accordance with a further feature of the invention, there is a speed-selective start-up procedure for the rotors. The two rotors of the double rotor machine enter into interaction selectively with different rotary field components of the rotary field in terms of frequency, and therefore run at usually different speeds. The selection of frequencies can be made for example with different moments of inertia, brakes that can be released depending on time, or different rotor types.

The invention is explained in more detail based on the design examples illustrated in the figure.

DETAILED DESCRIPTION OF THE PRESENT INVENTION

Figure 1:
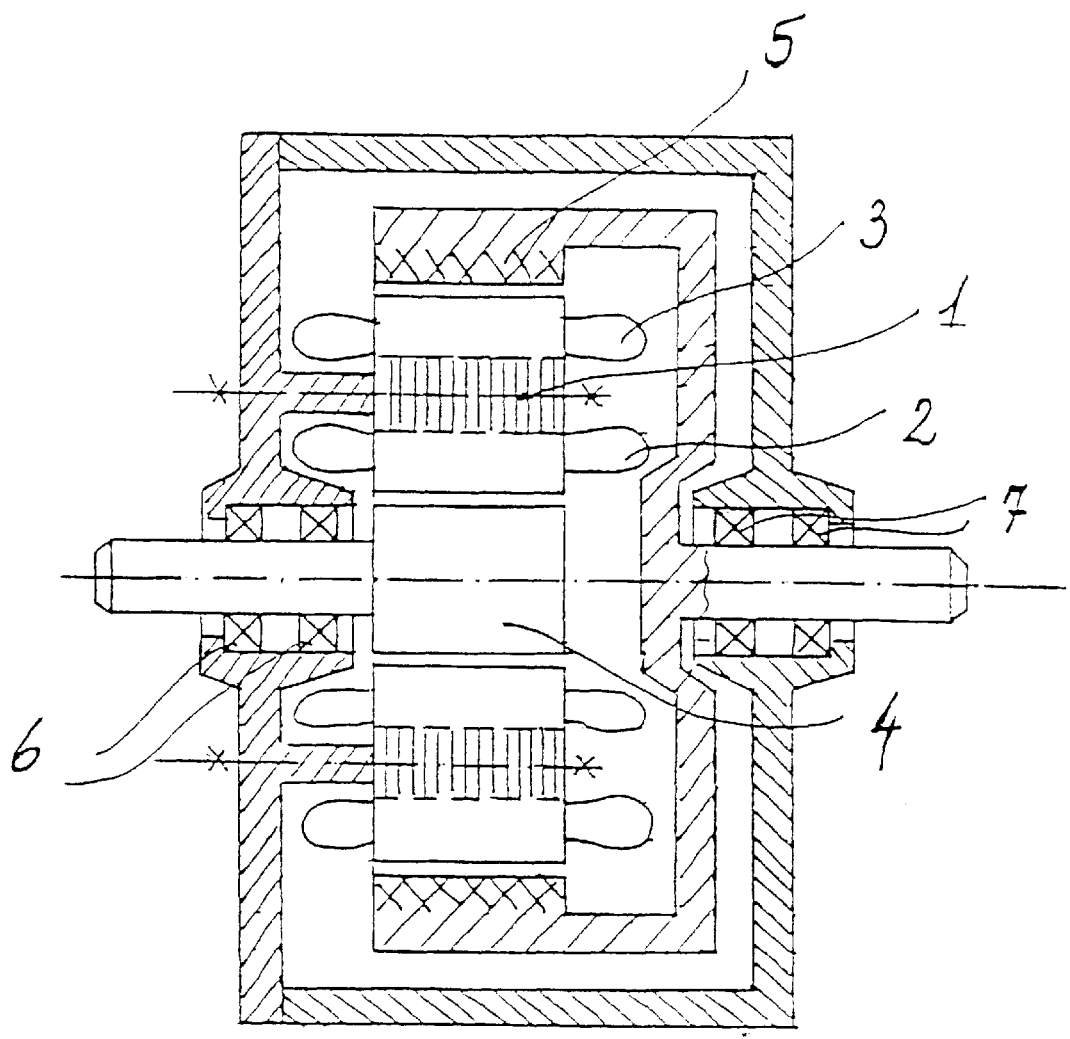
FIG. 1 shows a double rotor machine, whereby the stator has two independent windings.

Basically, various desing variations from double rotor machines are possible. FIG. 1 shows a double rotor machine with one stator 1, which has two independent windings 2, 3.

In the cylindrical motor array, one winding 2 is on the inside of the stator 1 or the stator bore, and is designed as a groove or air-gap winding. The second winding 3 is positioned on the outside of the stator 1 as a groove or air-gap winding, whereby winding 2 interacts with a rotor 4 designed as an inner rotor, and winding 3 interacts with a rotor 5 designed as an outer rotor. The rotors 4, 5 can be designed with permanent magnet excitation, as cage rotors, with a reluctance structure, etc. The two rotors 4, 5 are arranged mechanically on one suitable bearing 6, 7 each according to the state of the art.

Figure 2:
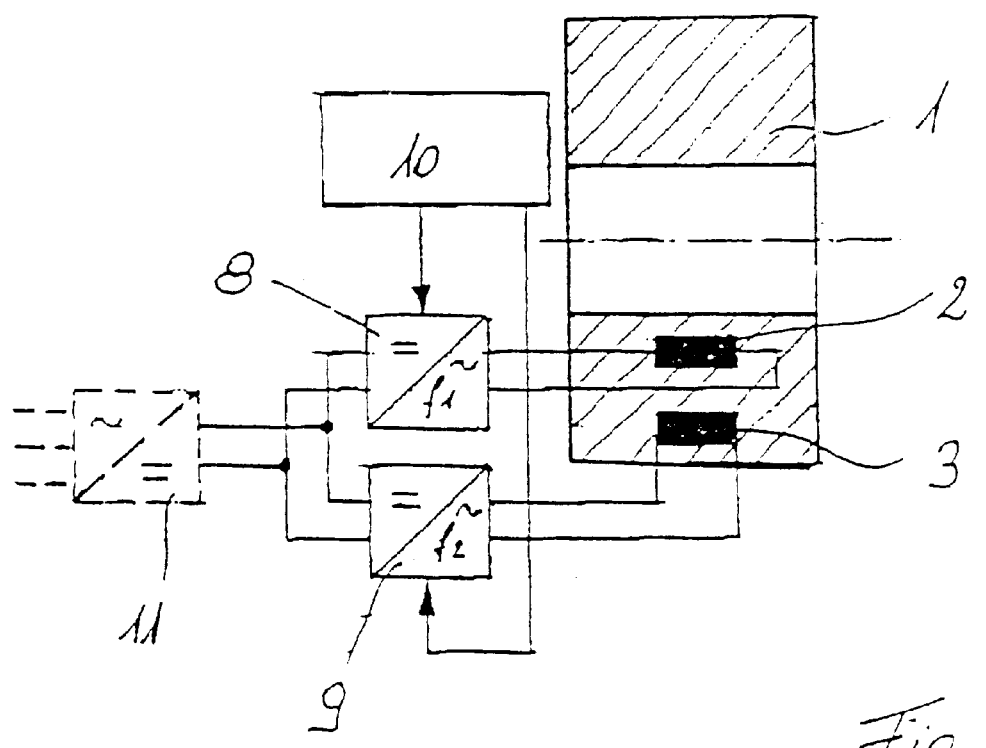
FIG. 2 shows the corresponding control, FIG. 3 a disk-type rotor structure, FIG. 4 a double rotor machine with one winding, and FIG. 5 a gear with variable speed ratio and optional electric power coupling and uncoupling.

In accordance with FIG. 2, the two windings 2, 3 of the stator 1 are supplied from generally different power sources. The power sources are preferably rotary current inverters 8, 9 with variable frequency and are controlled by the electronic control 10. The inverters 8, 9 may be supplied with one- or more-phase alternating current from the mains via the input current converter 11, or directly from a direct current source, e.g. a battery. In FIG. 2, the stator 1 and the windings 2, 3 are shown symbolically.

The advantage of this array with two independent winding systems lies in the fact that both parts of the engine can be controlled entirely independent of each other, and that they have only very little influence on each other.

Figure 3:
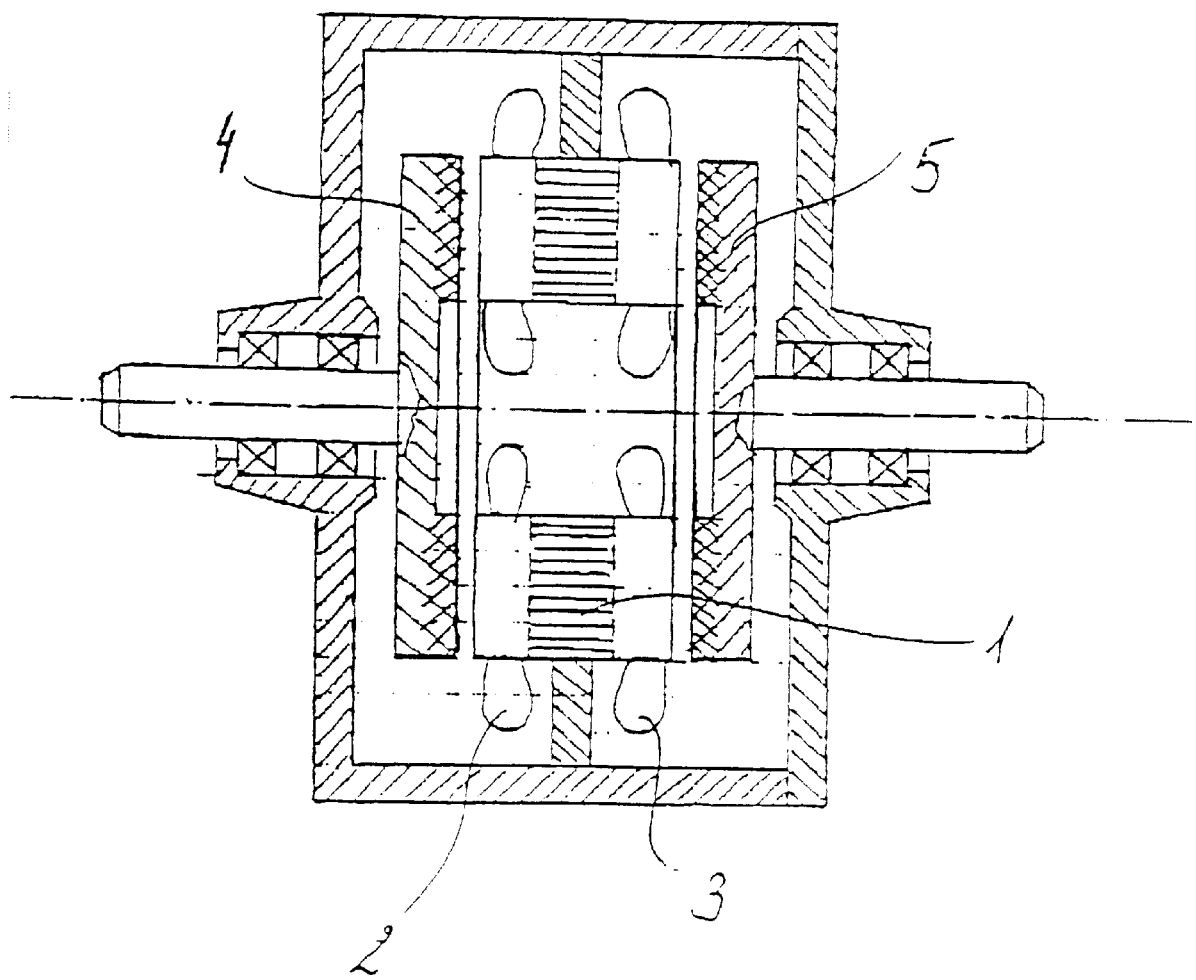

FIG. 3 shows an array as disk-type rotor. Thereby, the two windings 2, 3 are positioned on the right and on the left side of the disk-type stator 1 as groove or air-gap windings. The rotors 4, 5 are also arranged on the left and on the right of the stator 1 as disk-type rotors with permanent magnet excitation, as cage rotors, reluctance structures, etc. The two windings 2, 3 of the stator 1 are in turn supplied from generally different power sources in accordance with FIG. 2.

Figure 4:
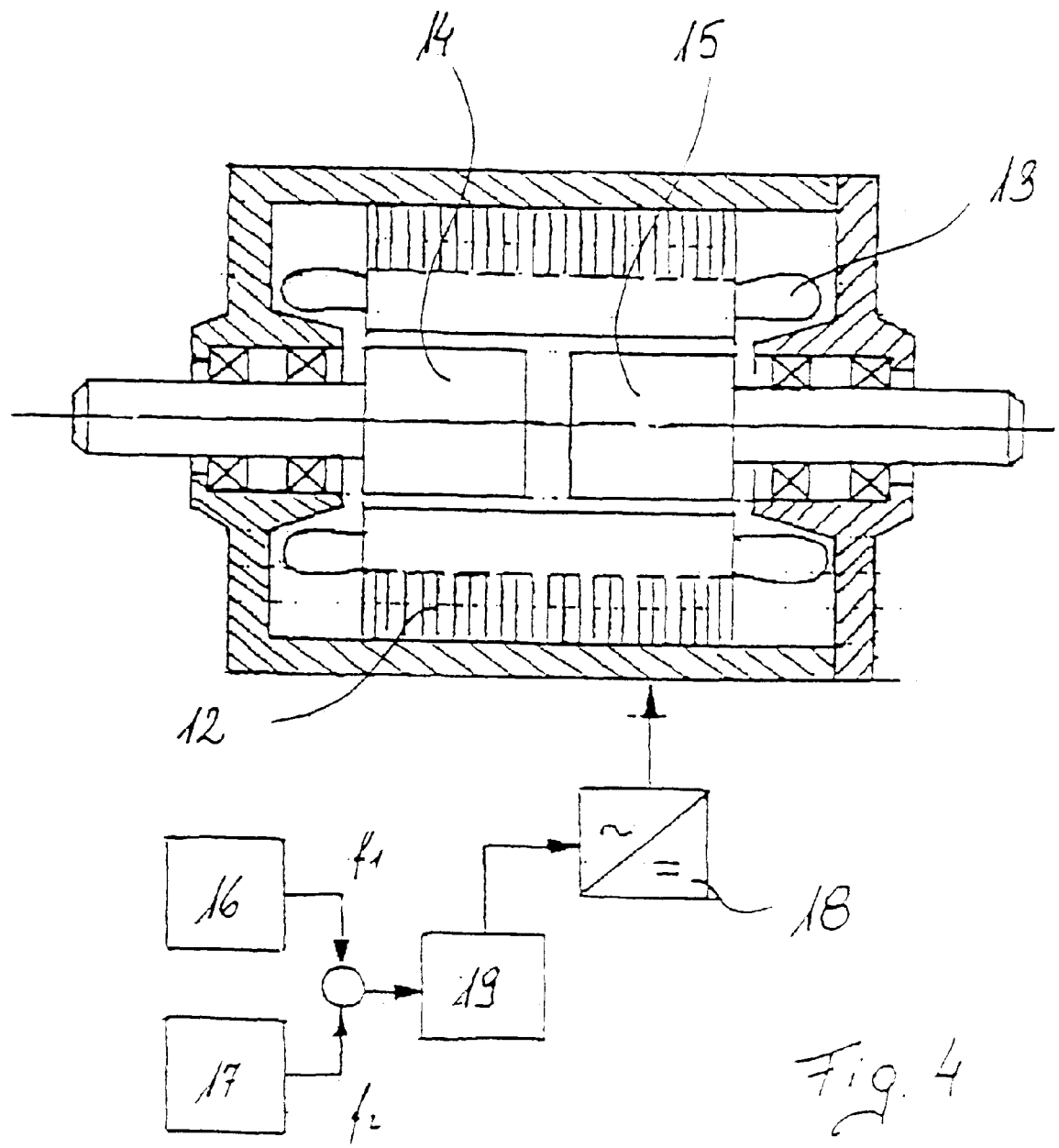

FIG. 4 shows a double rotor machine with one stator 12, which has only one winding 13. The winding 13 is supplied by a rotary current system which has two rotary field components (indicated by the frequencies f1, f2 in FIG. 4) in the rotary frequency spectrum via the electric control.

The two rotors 14, 15 of the double rotor machine enter into interaction selectively with different rotary field components f1, f2 of the rotary field in terms of frequency, and therefore run at usually different speeds. The selection of frequencies can be made for example with different moments of inertia, brakes that can be released depending on time, or different rotor types. Thereby e.g. one rotor 14 can be designed as an asynchronous cage rotor that accelerates with an accordingly high frequency on supply, whilst the second rotor 15 can be e.g. a rotor with permanent magnet excitation that generally does not start up at this same frequency and only develops a floating moment, and which then is brought to its speed—which differs from that of the asynchronous rotor 14—by means of a corresponding control, for example a field-oriented control, once the asynchronous rotor has accelerated. Other similar principles are conceivable, which achieve the different speed changes for the two rotors 14, 15 with the same supply. The two rotors 14, 15 run in a common bore in stator 12, for example as drum rotors or on the same side of the stator 12 as disc-type rotors in a concentric circular/annular or annular/annular combination.

The advantage of this array with one winding 13 lies in the fact that one winding and its corresponding supply, preferably an inverter, can be spared, and the two frequency components are already superimposed on the signal side by two motor part controls 16, 17, and supplied by a common power part 18 via the drive 19. The price for this advantage is a higher loss and vibration torque, but this is often acceptable in return for the more economic drive.

Figure 5:
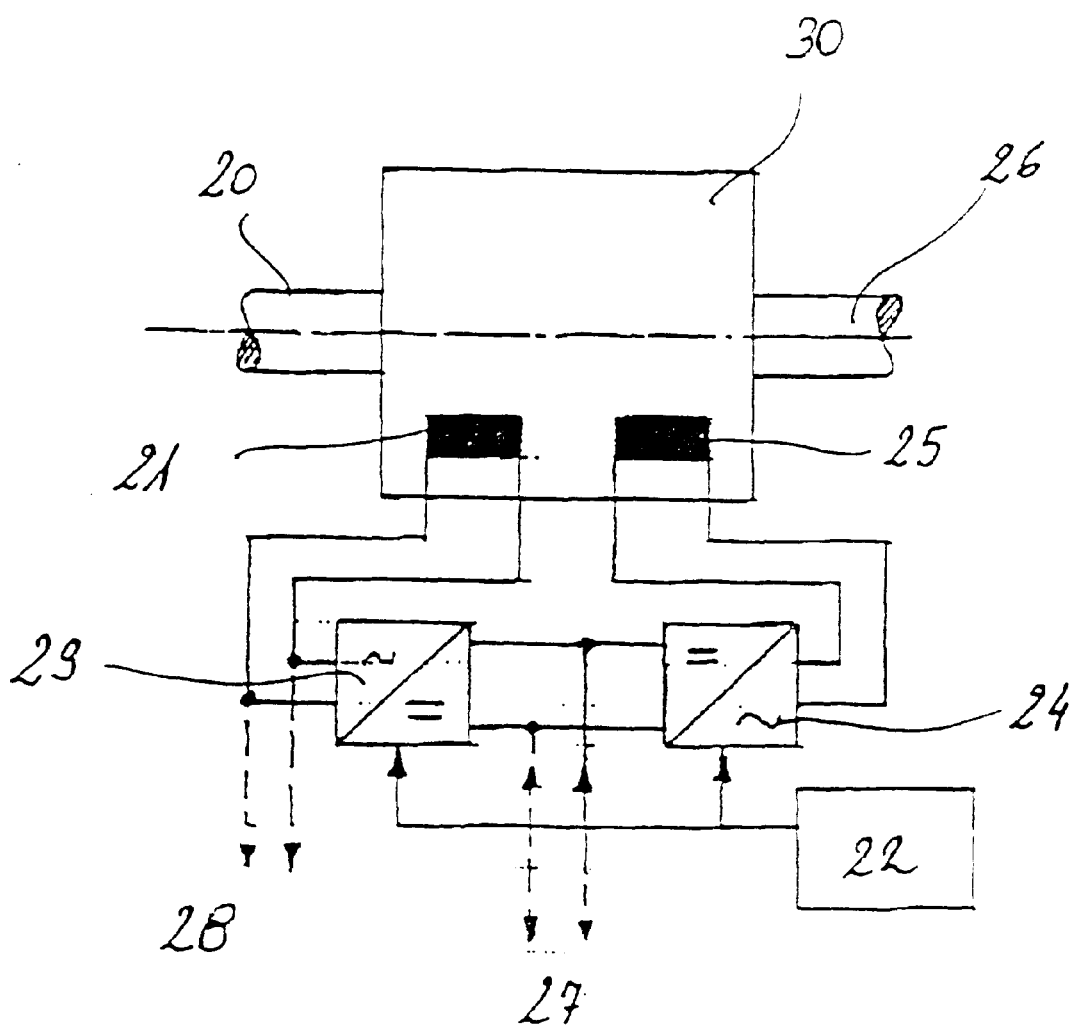

FIG. 5 shows a gear with variable speed ratio and optional electric power coupling and uncoupling. The described double or multiple rotor machines can be switched as mechanical gears with variable transmission and optional coupling and uncoupling of electric power. Thereby mechanical energy is supplied to the drive machine via the first rotor 20, designed for example as a rotor with permanent magnet excitation, transformed into electric energy via a winding 21 located in the stator 30 using the control 22 and the power part 23, and then transformed back into mechanical energy via the power part 24 using the control 22 via the winding 25 and the rotor 26, whereby the rotor 26 runs at a different speed from rotor 20. Via the electric intermediate circuit 27, electric energy can be exchanged optionally, for example with a battery or capacitor system, i.e. discharged, for example to supply an electric network, or supplied, for example for an increased power output of rotor 26 over rotor 20 or alternating, for example to compensate for torque ripple on the rotor 20. An electric energy exchange is also possible at position 28, e.g. in order to generate auxiliary power to supply the control 22 via a diode jumper.

Equally, mechanical energy of the same polarity can be discharged or supplied via the rotors 20, 26, as for example in differential gears, where the rotors 20, 26 pass on the electric power from the intermediate circuit 27 with independent speeds or torques.

The design of the double or multiple rotor machine as a gear offers the possibility of smooth speed transmission with simple controllability via an electric intermediate stage. Moreover, it provides a coupling function if required, whereby the system is uncoupled if a power part is not enabled. In addition, power can be drawn from the electric intermediate circuit in order to realise an electric power supply. Moreover, with the electric power supply a temporarily or permanently increased mechanical performance can be provided at the gear output. Moreover, torque fluctuations at one of the mechanical inputs of the gear can be compensated by electric power supply and discharge or be generated arbitrarily (vibration or breakaway function). Last but not least, a differential gear function can be realised by preferably electric power supply and bilateral mechanical drawing of power.

In conclusion, it is noted that in the various described embodiments the same parts are allocated the same reference numbers and the same component names, whereby the disclosures contained throughout the description can be applied by analogy to the same parts with the same reference numbers or same component names. Furthermore, positions details given in the description, e.g. top, bottom, side, etc., relate to the figure being described and illustrated at the time and with a change of position should be transferred accordingly to the new position. Moreover, individual features or combinations of features from the different embodiments illustrated and described can represent independent inventive solutions or solutions according to the invention in themselves.

The problem forming the basis of the separate solutions according to the invention can be taken from the description.

For form's sake, it is noted that for a better understanding of the structure of the machine, the components are illustrated partly untrue to scale and/or are enlarged and/or made smaller.

What is claimed is:

1. An electric rotary current machine, comprising:
   a casing;
   a stator fitted within said casing, said stator having at least one stator winding;
   at least two mechanically separate rotors rotatably mountable within said casing and having a same axis of rotation, whereby each rotor has electromagnetic interaction with said stator when said stator is electromagnetically active, wherein the rotor speeds are the same or different; and
   a motor control arranged to control a supply to at least one of said at least one stator winding by superposition of at least two rotary field components, one for each rotor.

2. The electric machine according to claim 1, wherein said stator has two separate windings supplied by a source of electric power, each of said windings having electromagnetic interaction with at least one rotor of said two rotors.

3. The electric machine according to claim 2, whereby independent control is used to supply the source of electric power to said two separate windings.

4. The electric machine according to claim 1, whereby one of said at least one stator winding comprises one of a groove and air-gap winding.

5. The electric machine according to claim 1, wherein at least one rotor is configured as one of an inner rotor and an outer rotor.

6. The electric machine according to claim 1, wherein the at least one rotor comprises at least two rotors, and both rotors are configured as one of inner rotors and outer rotors.

7. The electric machine according to claim 1, wherein the at least one rotor comprises at least two rotors, such that one rotor is configured as an inner rotor and an other rotor is configures as an outer rotor.

8. The electric machine according to claim 1, whereby said rotors and said stator are arranged in a disc rotor configuration.

9. The electric machine according to claim 1, wherein said at least one stator winding generates a magnetic field with at least two marked rotary frequency components having selective electromagnetic interaction with said rotors.

10. The electric machine according to claim 1, wherein electric power is fed to or from said at least one stator winding via electronic power modules.

11. The electric machine according to claim 10, wherein said electronic power modules comprise one of a transistor, GTO inverter, and diode rectifier.

12. The electric machine according to claim 1, wherein at least two rotors are linked via at least two windings and an electronic power module as an electric gear.

13. The electric machine according to claim 12, wherein electric power can be exchanged with an electric system via an electric gear media stage.

14. The electric machine according to claim 13, wherein said rotors are designed as differential gears.

15. The electric machine according to claim 1, further comprising a common electronic power input module and a plurality of electronic output modules corresponding to the number of said stator windings, said modules being controlled by a motor control.

16. The electric machine according to claim 1, wherein a speed-selective start-up procedure is provided for said rotors.

* * * * *